May 6, 1924.

R. A. ENGLER 1,492,972

DYNAMO ELECTRIC MACHINERY

Original Filed Dec. 5, 1911 5 Sheets-Sheet 4

May 6, 1924.

R. A. ENGLER

DYNAMO ELECTRIC MACHINERY

Original Filed Dec. 5, 1911    5 Sheets-Sheet 5

Inventor.
Richard A. Engler.

Patented May 6, 1924.

1,492,972

UNITED STATES PATENT OFFICE.

RICHARD A. ENGLER, OF CHICAGO, ILLINOIS.

DYNAMO-ELECTRIC MACHINERY.

Application filed December 5, 1911, Serial No. 354,245. Renewed January 26, 1920.

*To all whom it may concern:*

Be it known that I, RICHARD A. ENGLER, a citizen of the United States, residing at Chicago, in the county of Cook and State of Illinois, have invented certain new and useful Improvements in Dynamo-Electric Machinery, of which the following is a specification.

The distinction between the well known type of homopolar machine and that herein disclosed will be readily understood from the following: In the machine the operation of which I here show and describe, the magnetic poles and lines of force of the field shift or rotate with respect to the mass of the iron of the field, and that iron which at one instant may be a north pole will at another instant be a south pole. Thus the magnetic poles shift continuously and progressively in the iron. However, any given armature conductor in the type which I disclose always remains in a field of the same polarity and cuts the lines of force of that field. Now, in the ordinary homopolar machine, the lines of force at any given point in the iron remain at that point whether the field rotate and the conductor be stationary or vice versa, whereas, in my machine the lines of force grow up and remain stationary in the iron of the field magnet during an arc of rotation of the field equal to the breadth of the armature coils and then they die out, considering the armature conductors as stationary.

I have shown diagrammatically a number of machines, all embodying my invention and all operating to generate and convert electrical energy according to my new method.

Figure 1:
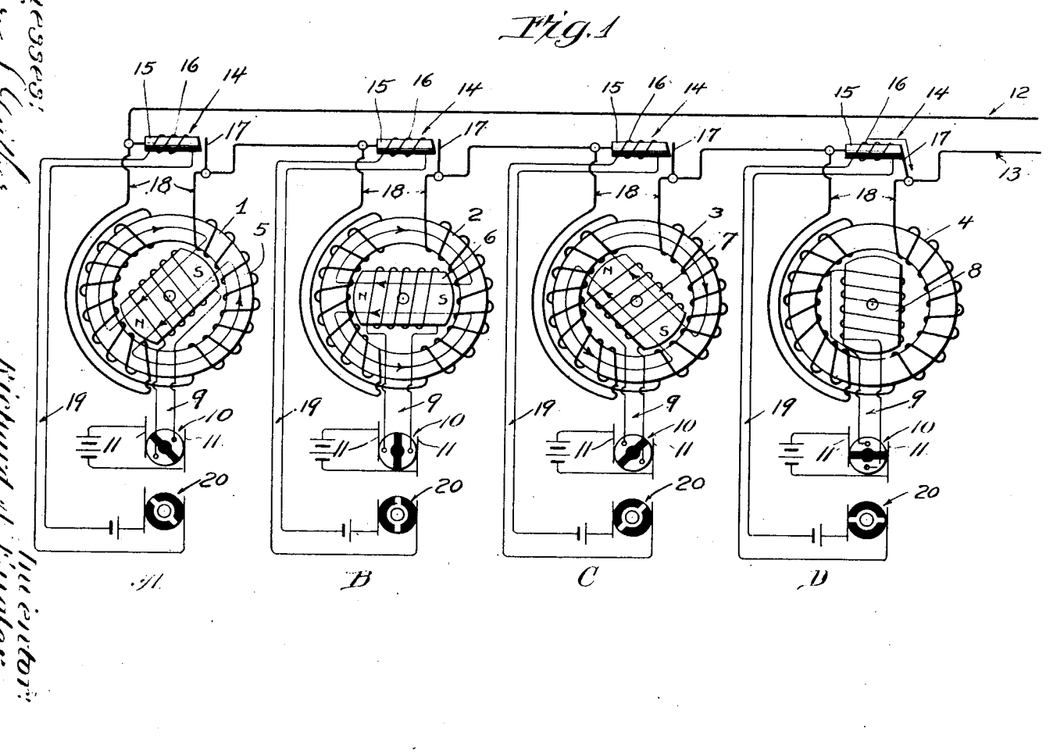
Fig. 1 shows diagrammatically a machine operating according to the method of my invention, in which a number of units, each having its field excited by a commuted direct current, are connected up in closed coil arrangement, to secure proper co-operation between them.

In Fig. 1, I have shown one form of machine embodying my invention. In this case, I have provided a number of rings of magnetic material 1, 2, 3, and 4, within which there rotate masses of magnetic material 5, 6, 7, and 8, respectively. A power winding is provided on each of the armature rings, and an exciting winding on each of the internal field masses. It will be understood that all of the fields rotate together, as would be the case if they were all mounted on the same shaft. Each pair of terminals 9 of each exciting winding connects to a commutator 10, the brushes 11 of which are supplied with direct current from any suitable source.

The terminals of the machine are shown at 12 and 13. A shunting relay 14 is provided for each unit, said relay comprising a magnetic core 15, a winding 16 and an armature 17. The armature terminals 18 of each unit are connected to the core and armature of the corresponding shunting relay and to the remaining units, and to the line in such way that when the corresponding relay is not excited that unit is in series with the remaining units and the line. On the other hand, when the relay is closed that unit is shunted out of the circuit, the current from the other units passing through the relay core and armature to line. The winding of each relay has its terminals 19 properly connected to the brushes of a contact maker 20, each of which contact makers rotate in synchronism with the field of its corresponding unit, and means are provided for supplying current to the individual relays, as required. Now each of the contact makers is of such construction that it only closes the circuit of the corresponding relay for an instant at the time when the corresponding field mass is passing through the neutral position, as shown in the unit D, the relay being inactive at other times, as shown in the units A, B and C. All of the fields, commutators, and contact makers of all of the units rotate in synchronism.

The operation of this machine is as follows: As soon as the field of each unit passes the neutral position, the corresponding commutator establishes the proper connections to excite it, one end as a north pole and the other end as a south pole. The excitation of that unit remains constant until the mass has rotated over 180° to the neutral position again, at which instant the relay circuit and relay closes, and the commutator reverses the current in the field. As the field rotates, a slight additional amount, the pole which was formerly north becomes south, and so the former north is now the south pole. It is, therefore, obvious that all of the conductors on one side of the power winding will always be cut by a field of force emanating from a north pole, while the conductors on the other side of the winding will always be cut by a south field. Now, it is evident that as each end of the field sweeps past a power winding the individual lines of force emanating from that end must travel with it to be cut by the adjacent conductors of the power winding. This must be true because the lines of force are enclosed by the winding on the rotating mass of magnetic material. It is furthermore evident that, considering all of the units as a group, and they must be so considered in this case, because they are all connected in series and act on the same line terminals, the same effect is produced and the operation is exactly the same as though all of the individual fields acted on the same ring of conductors, the net result of the above operation is that a unidirectional electro-motive force appears at the line terminals.

Considering the action in the unit D, since the commutator there is in such position as to short circuit the current supplying the field 8, the lines of force of that field must vanish, and on turning a slight additional amount the new set of lines of force must appear. It is evident that, the falling of one polarity and the rising of another as the commutator reverses the currents, will induce momentary currents, both of like nature but in opposition to those generated in the power windings by a rotation of the field. Therefore, by providing the shunting relay, I keep these opposing currents from the main line current. The currents from the other units and line and those from the short circuited armature winding both flow through the relay core and its armature. It is evident now that this relay is equivalent in this respect but only in this respect to the brushes and two segments of commutator on an ordinary direct current dynamo. By properly constructing the contact maker to give a long or short interval of contact, we can regulate the length of time during which the relay is closed. This will allow the currents of opposition induced by the reversing of the field by the commutator to have ample time to disappear, and also to start a new and properly directed current in the armature before opening the relay and sending the current to the line, thus preventing sparking at the relay. In this way, the relay with its contact maker is equivalent to a narrow or wide brush and space between the segments of commutator in the ordinary machine for the same purpose. Shifting the commutator and contact maker on the shaft relatively to the rotating mass is equivalent to giving a lead to the brushes in ordinary machines. The brushes in this machine, Fig. 1, might also be shifted. The commutator segments may also have a narrow gap or a wide one so that the two currents of fall and rise may take place practically as one, or with a time interval between them. Since the armature is short circuited through the relay, the fall and rise of the field polarity induces currents which flow in this short circuited armature winding, thus reducing the self-induction in the field winding to nil, and and no spark is produced at the commutator. Since the field requires only a small current as compared to that generated in the armature, and since it is possible to wind the fields with comparatively few turns to obtain the required field strength, sparking at the commutator will be negligible. The currents of opposition and those that result from the various active units all flow through the relay core and its armature in the same direction. Therefore, when the field has reversed and a new and proper current started in the armature coils, these new armature currents will oppose the currents from the active units flowing through the relay and will force the currents to flow through the armature coil, thus aiding in producing a sparkless opening of the relay.

The methods employed for commutation and suppression of sparks in ordinary dynamos are in general applicable in these machines.

The relays can be placed apart as desired which is impossible or impracticable with the brushes and two segments of commutator.

By placing the relays or their equivalents far apart, or by immersing them in oil, I need not predetermine the potential between them as is necessary in constructing a commutator. Thus I can provide a construction employing a reduced number of coils in the armature and still take care of the self-induction and also have a uniform direct current. Since the relays are each entirely independent and stationary, sparking might even be allowable, as renewal contacts can be provided, and the relay adjusted while the machine is in operation. With four units, as shown, I have found by demonstration that the current is uniform enough for all practical purposes. The reversing and shunting takes place twice per revolution in the arrangement shown in Fig. 1. In an ordinary machine two coils at least are shunted and reversed at a time, while in the present case only one coil is shunted that is, two coils connected as one.

The commutator of the field might be shifted slightly forward or backward on the shaft, so that the field would take up a proper position with respect to the armature windings. This would ensure that the field magnetism would take up a proper position with respect to the armature magnetism. The contact maker might also be shifted on the shaft forward or backward to correspond with the lead given to the corresponding commutator.

It is evident that one unit alone would give a pulsating direct current, while when several units with fields set at different phase positions are operated together, as shown in Fig. 1, all of these pulsating currents are overlapped on the line, and a continuous current results. Instead of shifting the fields separately to different phase positions on the shaft, they may all be placed alike on the shaft and the neutral positions of the armatures given the necessary phase displacements. In the arrangement shown in Fig. 1, we have the operations taking place in the armature, commutator, and brushes of ordinary dynamos completely separated, as here the shunting only takes place in the armature, and the reversing in the field, the result being that a unidirectional electro-motive force appears at the terminals of the armature just as in ordinary machines.

In this arrangement also, we can adjust each relay, while the generator is in motion, and since each relay is a separate element, a wide range of adjustment, not possible with the commutator segments and the brushes of an ordinary dynamo is possible.

In Fig. 1 the magnetic loops are shown. Following the arrows of these loops we find this: In unit A the lines of force have just come on with the north pole downward at the left; in unit B the lines are midway between the change of flux position; and in unit C the north pole is now up on the left and consequently ready for a fall of lines which then induces a current of the same direction as was induced in unit A when its field reversed; both currents will be in opposition to the currents caused by rotation which are sent to line. Therefore in Fig. 1 as shown there are three active elements and one inert, as will always be the case. It is evident that these "currents of change of flux" aid the line currents in a motor.

Figures 2, 7:
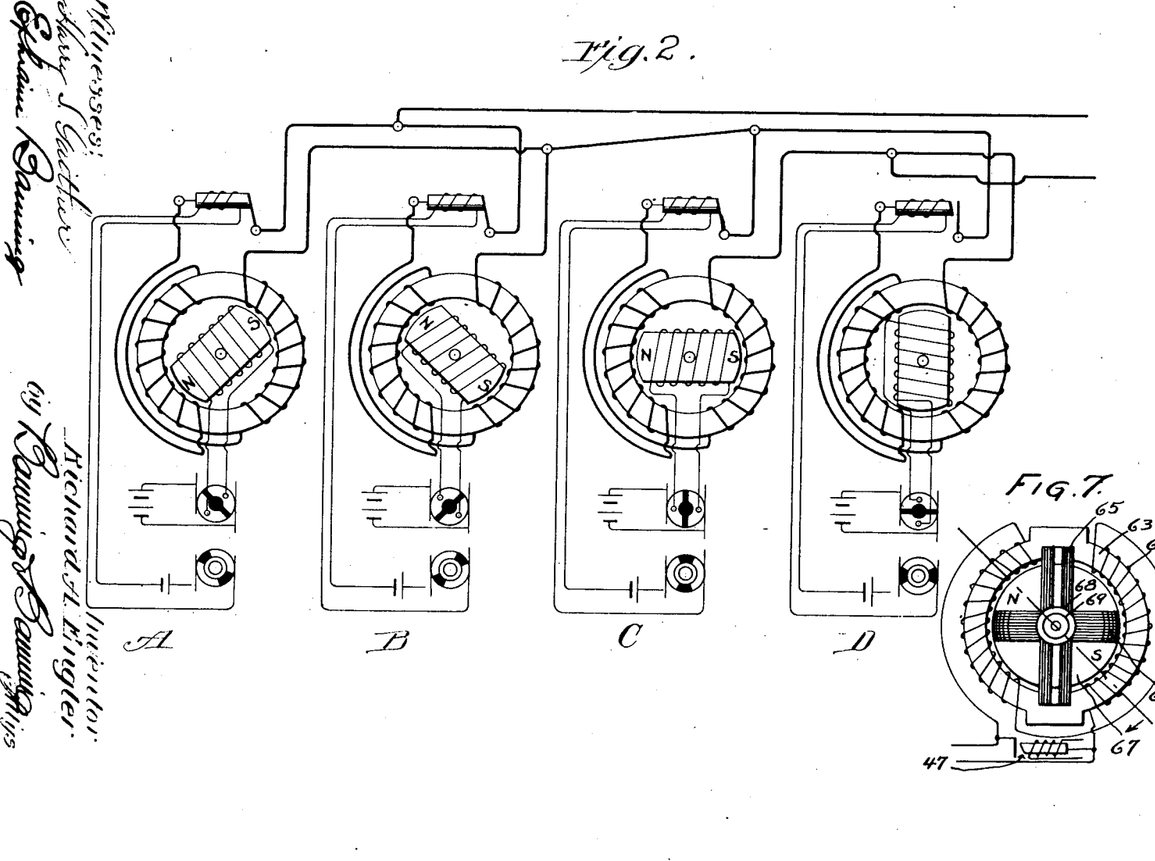
Fig. 2 shows diagrammatically a machine operating according to the method of my invention, in which a number of units, each having its field excited by a commuted direct current, are connected up in series parallel, otherwise known as open coil arrangement, to secure proper co-operation between them.
Fig. 7 shows one unit of a machine or transformer operating according to the method of my invention, in which co-operating direct current-fed field coils serve to sweep the lines of force across the armature coils in accordance with the principle shown in Fig. 22.

In Fig. 2, I have shown an arrangement similar to that in Fig. 1. In this case, however, the units are connected up in series-parallel, and in what may be called an open coil arrangement. At the particular instant depicted in Fig. 2, the unit D is inactive, the units A and B being in parallel with each other, and in series with the unit C. At another instant, the unit D will have become active when its relay closes, and will be placed in parallel with the unit C, and the unit B will be inactive, when its relay opens at the same instant. The units of this arrangement must likewise be considered as a group and not individually.

All of the units might be in parallel with each other and the line. The action of the current and coils of the armature in this case is similar to that in the well-known "Brush" arc machine. As soon as the two coils in parallel generate currents differing much in value, the weaker one must be cut out of circuit or opened as is the case with unit D. Otherwise, as in the Brush machine, the stronger unit would force current through the weaker one instead of out on the line. It will be noted in this figure that, as in the Brush commutator, the insulating gap of the contact makers is wider than shown in Fig. 1, the purpose being to accomplish this end. The same effect would be produced if all were connected in parallel with the line. Only one relay operates at a time. Suppression of sparking and communication has been explained in connection with Fig. 1, and applies with equal force to that necessary and known in the "Brush" machine.

Figure 3:
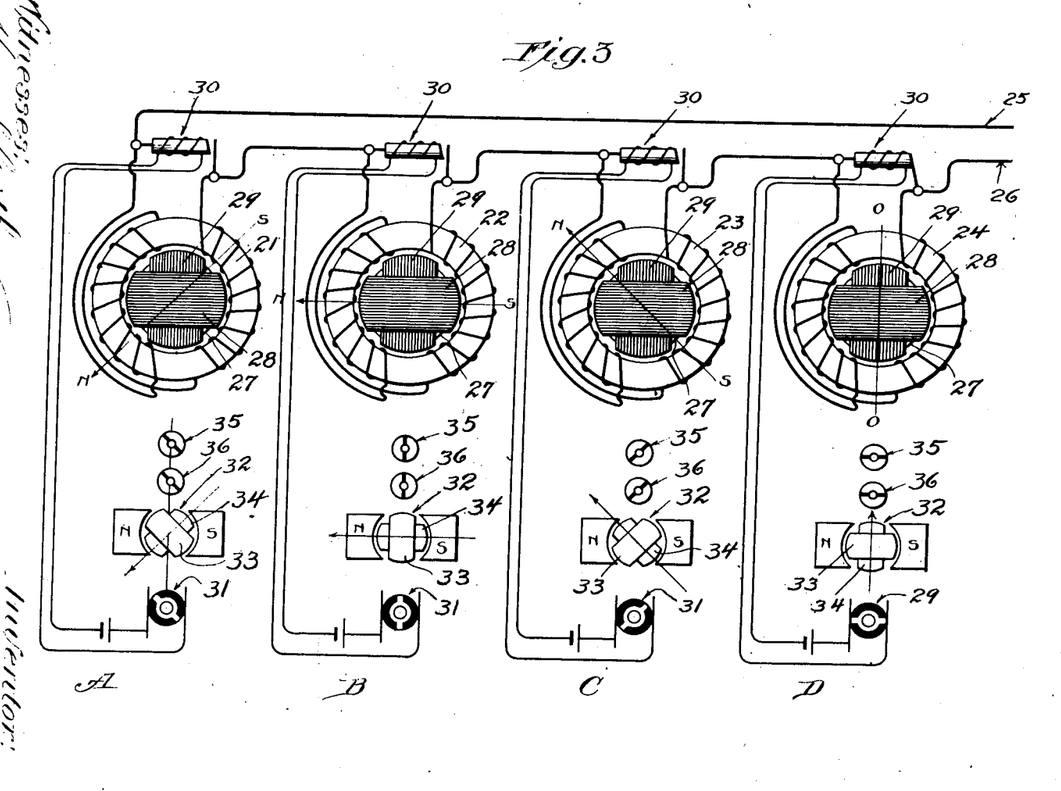
Fig. 3 shows diagrammatically a machine or transformer operating according to the method of my invention, in which a number of units, each having its primary excited by a polyphase generator to produce rotating magnetic fields, are connected up in closed coil arrangement to secure proper co-operation between them.

In Fig. 3, I have shown another form of machine or transformer also embodying my invention. In this case, there are provided four iron rings 21, 22, 23 and 24, each of which is provided with power windings to feed into terminals 25 and 26. Within each ring is provided a magnetic core 27 on which there is a pair of windings 28 and 29 which are set at right angles to each other. A shunting relay 30 is provided for each of the units A, B, C and D, the same being actuated by a contact maker 31 rotating in synchronism with the rotating magnetic field of its corresponding unit, and being supplied with current in any suitable manner. A polyphase exciter 32 is provided for each unit, the same having windings for supplying current to each of the corresponding windings 28 and 29. In the present instance in which the windings 28 and 29 are in quarter phase relation, I have provided corresponding exciting coils 33 and 34. These coils supply current to the windings 28 and 29 through commutators 35 and 36, so that the currents in said windings 28 and 29 will be reversed at the proper instants.

If only one connection were to be reversed then the direction of field rotation will be reversed, but not the polarity; but when both coils of the exciter are reversed, then rotation is in the same direction, b t polarity is reversed. Now, on account of the phase relations of the electromotive forces generated in the coils of the exciter, there will be produced a rotating magnetic field, by the co-operation of the windings 28 and 29, in the same iron core 27, and said fields will travel past the corresponding power windings or secondaries on the iron rings. If the commutators 35 and 36 were not provided, each of these rotating magnetic fields would travel in a complete circle so that an alternating current would be generated in the power windings.

Now the rotating magnetic field acting in each of the units will be in the nature of a mass of magnetic lines of force which come on at one end of the armature or secondary winding, travel half way around the ring armature and then die out. Therefore, considering all of the units as a group, and they must be so considered in this case, we will have a series of these masses of magnetic lines traveling past and being cut by the power conductors. The units must be considered as a group in this case, because they all act in series to supply current to the same terminals. In all respects of operation, the arrangement of Fig. 3 is similar to that of Fig. 1, with only this difference that, instead of being a physical rotating field, we have only a magnetic field in rotation, but generating direct currents from an alternate current as in Fig. 1. The contact maker, exciter armature, and the two commutators for the same in each unit, and all of the units, may be located on the same shaft, but should rotate in synchronism with each other and with the rotating fields. It is obvious that the exciter coils of all units might be put into a common field of force.

The armature or secondary which generates the direct current, and the field coils and core, or primary, being all stationary, might be immersed in oil, when extremely high voltages are being generated in the secondary. In the arrangement shown in this figure, the neutral positions of the secondaries may have a phase displacement, or the two field coils of the primary producing the rotating field together may have a phase displacement.

Figure 4:
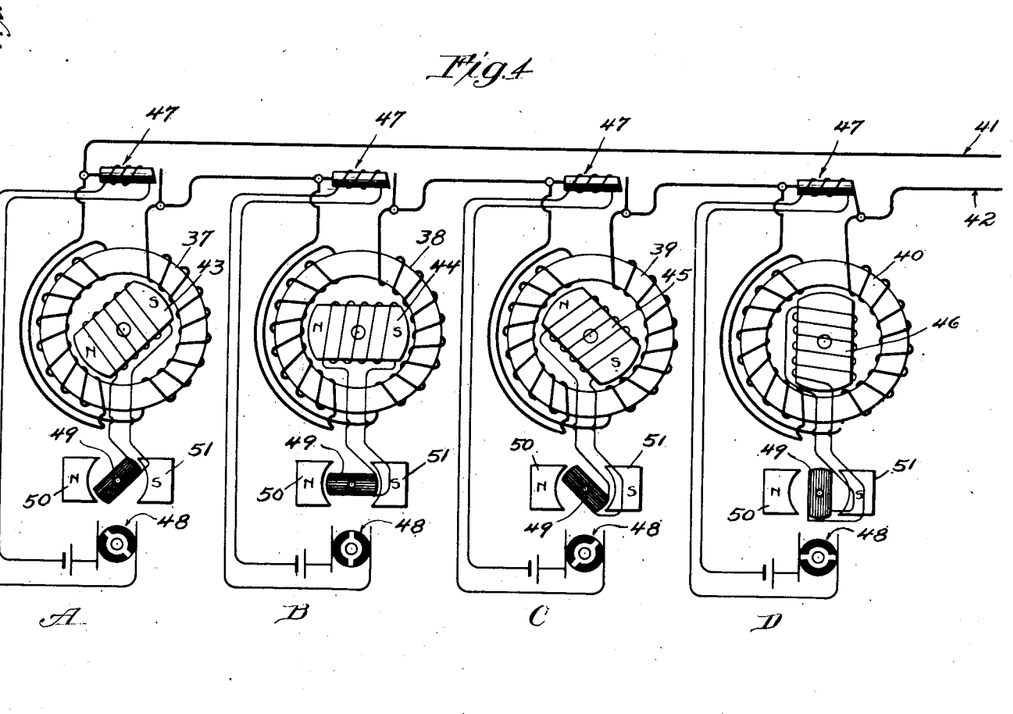
Fig. 4 shows diagrammatically a machine operating according to the method of my invention, in which a number of units, each having its field excited by the current from a single phase exciter, are connected up in closed coil arrangement to secure proper co-operation between them.

In Fig. 4, I have shown another machine also embodying my invention. In this case, I have provided four iron rings 37, 38, 39, and 40, each of which is provided with a power winding, as heretofore, and all of which act together to supply current to a pair of terminals 41 and 42. There are also provided the fields 43, 44, 45 and 46. In this case also the relays 47 act to cut the several power windings into and out of circuit by reason of the contact makers 48 as in the previous cases. In this case, however, the winding on each of the fields is excited by means of a coil 49 which rotates between constant field poles 50 and 51. As the coils 148 rotate in synchronism with the corresponding fields they generate electromotive forces of such direction, so that the magnetism of the fields automatically reverses without the necessity of a commutator of any kind, so that the lines of force passing one set of power conductors are always north, while the lines of force passing the other set of conductors are always south. At the instant when the magnetic lines of force of any field die out, the corresponding relay actuates to cut that unit out until the magnetism starts to build up again.

Now, considering each of the units by itself, the magnetism of the corresponding field starts at zero when in the position D, and gradually builds up to a maximum as in the position B. The magnetic intensity then decreases until finally it has again died out, when a half rotation has been completed. For this reason, in each unit the magnetic lines of force will be gradually brought into existence as the field starts to move from the zero position, and will gradually increase in strength until a quarter rotation is completed, when they will gradually decrease back to zero. Therefore, the lines of force of each field will sweep across the corresponding conductors and be cut by them to generate an electro-motive force in them. However, considering all of the units as a group, and they must be so considered in this case, because they all act in series on the same pair of terminals, the different fields with their lines of force will successively be cut by the power conductors. In this case also a stationary wave of energy, considering all as a group, occupies a position in front of the conductors and remains stationary with respect to them, but in reality traveling in opposite direction to the rotation of the iron of the field, while the individual poles with their lines of force travel across the conductors with the rotation of the field iron, so that the individual lines of force are cut by the conductors.

The arrangement of Fig. 4 is, therefore, similar to that of Fig. 1 in action, but its action is more nearly absolutely uniform, and follows more nearly the nature of a true wave field. In Fig. 1, the wave form is square-topped, owing to the sudden reversal of current by the commutator. In the present instance, the wave form of the field is the same as that of the current in the exciter. Now in position A of Fig. 4, as the exciter coil begins to generate, the field pole will begin to be energized, and as it rotates, we will have the following action; the increase of lines of force due to increase of current from the exciter will induce an electromotive force in the reverse direction to that desired; but since the field rotates, the two electromotive forces generated will neutralize each other at the start. As rotation continues, the increase of lines of force, and, therefore, the opposing induced electromotive force gradually lessens in proportion to the electromotive force generated by rotation, and that generated by rotation will be at a maximum in position B, there being no increase of lines of force, and no opposing electromotive force. But now, as rotation continues, as in position C, the exciter will be passing out of maximum action, and, consequently, the field will begin to weaken, and the fall of lines of force will again induce electromotive forces in opposition to those of rotation, and a gradual fall to zero of the electromotive force of the unit will take place in a similar manner to that in which the gradual rise to maximum electromotive force took place. A flat-topped wave from the exciter is here desirable.

The magnetism of the pole rising and falling is of the same polarity, but the direction of the pole is different; for instance, in position A from that in position C. Consequently, the induced electromotive force of rise and fall is in the same direction. The coils may cover the iron ring completely, so that the electromotive forces of change of flux and those of rotation act properly together, and thus more active conductors may be used and the weight efficiency may be increased. For these reasons, in this machine we are reaching ideal conditions; that is, no sliding contacts whatever are necessary, and a perfect uniformity of electromotive force may be obtained. Evidently, all of the exciter coils might be put into one armature and into one field, being then a true polyphase generator, each coil supplying its proper field as before, and all fields acting on one ring or drum if desired. Reversing the fields of the exciters, in the arrangement shown in this figure at the proper instants, will produce an alternating current in the armature of the machine. When Fig. 4 is used as a motor it is evident that it will not be self-starting. A. C. as well as D. C. may be used in all these machines as motors herein described.

Figure 5:
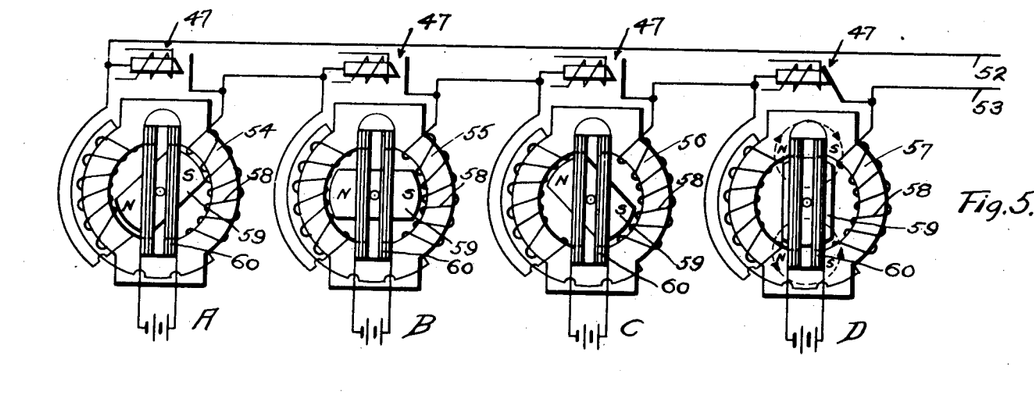
Fig. 5 shows diagrammatically an arrangement operating according to the method of my invention, in which a number of units, each provided with a stationary direct current fed field coil, a rotating mass of magnetic material and an armature and each operating according to the principle shown in Figs. 1 to 4 inclusive, co-operate to produce a continuous unidirectional electromotive force on the line.

In Fig. 5 I have shown diagrammatically a machine embodying the elements of my invention. This machine comprises four units A, B, C and D, all acting to supply current to the lines 52 and 53. These units comprise rings of magnetic material 54, 55, 56 and 57, and windings 58 within each of which rotates an inductor of magnetic material 59. These inductors revolve together in fixed phase relation with respect to each other. Each of these units is provided with an exciting winding 60, which is fed by direct current from any suitable outside source, or from its own armature. Obviously, each of the exciting windings will produce a north pole on the one side and a south pole on the other. Therefore, as each of the inductors revolves, its end which passes up adjacent the conductors on one side of the power winding will always be a north pole and its end which passes down adjacent the other side will always be a south pole. As each inductor comes into the neutral position, as shown in the unit D, the lines of force of the corresponding exciting coil will be short circuited between the ends of the inductor and that portion of the ring 57 adjacent the same, as is shown by the curved arrows, so that the conductors of the power winding will cease to cut the lines at such instant and must therefore be shunted by the relay 47 at such instant for the reason given heretofore.

As each of the inductors continues in its rotation, its ends will be reversed in polarity, so that the conductors of the power winding on the one side of the armature will again cut north lines of force and the conductors on the other side will cut south lines of force, the action in Fig. 5 being exactly the same as that described in connection with Figs. 1 to 4 inclusive.

It will be obvious from a study of the above arrangement that the method of field excitation in this case is similar to the excitation which can be given by means of the back ampere turns due to the lead given the brushes of an ordinary direct current dynamo, when its brushes are given a backward lead, using this method of exciting the field alone. In the present instance, however, the back ampere turn excitation can be entirely independent of the current in the power winding or armature. When a motor is given a forward lead, we can again make use of a belt of conductors equal in width to twice the angle of lead, to excite the field, as may be done in the case of a dynamo when using the backward lead. However, as is well known, it is impossible in practice to excite in this manner, as the sparking is destructive at once in either case, on account of the necessity of using a commutator which with the brushes must form the terminals for both armature and excitation belts. On the other hand, in the present case the armature is permanently connected to its terminals and independent of the field exciting current. By independent I do not mean to imply that the circuits are necessarily isolated from one another, for in some instances there might be electrical connections between them without necessarily producing any new or different actions, as for supplying the field from the armature instead of from an outside source.

In Fig. 5, by giving the field coils a forward or backward lead, we can get the proper neutral position and resultant field for best operation of the machine.

Figure 6:
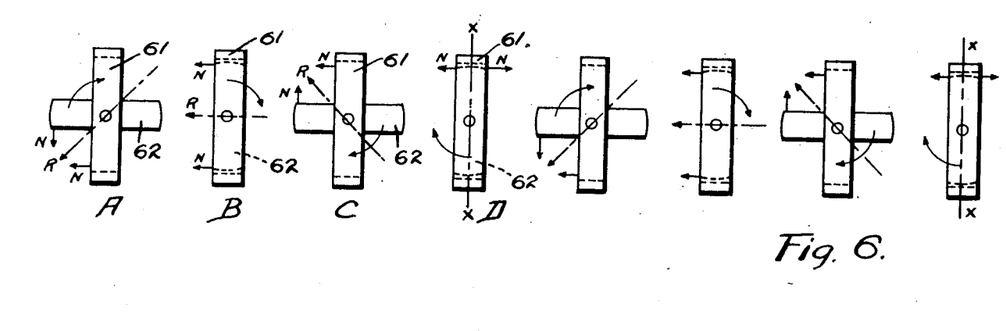
Fig. 6 shows diagrammatically eight positions of the primary of a transformer; that is, how a pair of direct current-fed field coils, one rotating with respect to the other, will so co-operate as to produce a magnetic field in which the lines of force sweep across each side of the stationary coil but do not reverse polarity or direction of rotation.

In Fig. 6 I show diagrammatically how it is possible by means of two coils constantly excited by direct current to secure the effect of having a magnetic field start at zero, then sweep upwardly in one polarity and die out and then sweep up in the same polarity and again die out, etc., by simply causing a relative rotation of the coils. For purposes of illustration, I have shown the coils in eight different positions corresponding to two complete revolutions. The coil 61 is shown stationary, while the coil 62 rotates within the same. Assume that the current in the coil 61 is such that its magnetism produces a north pole to the left, as shown in the position A. Assume further that both of the coils have an equal number of lines of force. Then with the coils at right angles as shown in position A, the resultant R will be half way between the coils, as may be demonstrated by the parallelogram rule. As the coil 62 rotates, the amount of excitation in each coil remaining constant, the resultant will gradually increase in strength and sweep upwardly until the coils lie parallel to each other, as shown in position B, the resultant magnetic field having traveled one-eighth of a revolution, and the resultant excitation being the sum of the individual excitations. As the coil 62 continues its rotation, the resultant will swing around into the position shown at C, and the field will gradually decrease in strength, until the position D is reached, in which the coils act in direct opposition. At this instant, the net magnetic force will be zero.

As the coil 62 continues in its rotation, it will be found that the resultant is again with a north pole to the left and that the above process will be again repeated, the north pole starting at the bottom and rotating upwardly and finally dying out when the the coils come into neutralizing parallelism. In other words, with this arrangement, the resultant magnetic field is one in which a north pole will start at the bottom with a zero intensity, sweep the one side with an increasing intensity until the maximum is reached, and sweep on up to the top with a decreasing intensity until zero is reached. At the next and each succeeding time, this same process will be repeated so that a north pole will always be sweeping up on one side and a south pole down on the other to produce a rotating field. A study of the above will show that the intensity of the resultant field can be represented by a true sine wave having its zero points at the lower and upper extremities and its maximum at the point where the coils lie parallel but not in opposition. The current flowing in the coils might also be varied so as to vary the curve of field. It will be understood that the above description simply illustrates how one pair of coils, that is, one unit operates.

It will be noticed that in position A, the two field coils tend to place themselves with their axes parallel and therefore rotation will be aided and in position C the coils tend again to place themselves with their axes parallel but this time the tendency is to oppose that of rotation. Thus, the actions and reactions of such a pair of units are equal, and their net effect is zero; and this is true of all of the phase positions of a complete revolution. Considering the eight positions shown as eight units and each unit as passing thru all of the phase relations, the actions and reactions will always be opposite and equal. Thus only sufficient power is necessary to overcome friction to rotate the coils. It will be evident that this form of apparatus can be used with such an armature as is used in Fig. 1.

In Fig. 7 I have shown how the above principle can be applied in a machine embodying my invention and have herein shown a single unit. In this case, a ring of magnetic material 63 is provided for each unit of the machine, a power winding 64 being placed on the same. One of the exciting coils 65 is fixed with respect to the ring armature while the other coil 66 is placed on a core of magnetic material 67 which is rotatably mounted within the ring armature or secondary. A pair of slip rings 68 and 69 must be provided for feeding the coil 66 with direct current. As the core 67 and coil 66 rotate, the resultant effect will be that a north pole will sweep up and be cut by the conductors on one side of the power winding, and a south pole likewise sweeping down to be cut by the conductors on the other side. However, any given conductor will always cut a north pole or a south one, as the case may be. Therefore, the result will be that a unidirectional electromotive force will appear at the terminals of the armature or secondary winding when a relay 47 is provided as and for the purpose shown in Figs. 1 to 5 inclusive.

A number of units of this kind placed in proper phase relation will generate a uniform direct current when all are properly connected as heretofore explained in connection with other mechanism embodying my invention.

A flat topped wave form field is desirable for use in this apparatus. The core of Fig. 7 may also be of the same form as those shown in Figs. 1—2—4—5.

For showing a more extended use of the principle explained under Fig. 6, I will call attention to my article on "A new commutatorless A. C. and D. C. machine," page 1144 of the "Electrical Experimenter" (now "Science and Invention") for March 1920.

Although I have shown and described above a number of arrangements for generating, transmitting, and converting electrical energy each embodying the elements of my invention, still it will be obvious that the invention itself is in no wise limited to the particular arrangements illustrated, but that other arrangements might be employed without departing from the spirit of my invention. It will also be understood that, although I have described the above arrangements as they would operate to generate a direct electric current, still some of them might be used to absorb current and run as motors, or generators, and some of them might be used simply for transforming from one kind or one intensity of electrical energy to another. For example, in the arrangement shown in Fig. 3, power is derived primarily from the exciters 131, and there is no physical movement of the iron and copper of the primary and secondary elements. In other words, the arrangement shown in Fig. 3 transforms alternating currents of one potential to direct currents of the same or another potential. In other words, the arrangement constitutes virtually a direct current transformer, operated by polyphase currents in the primary windings.

All of the machines herein shown and described, when used as generators, are self-exciting, and whether used as dynamos, motors, convertors, or auto-convertors, may have their fields excited separately, in series, shunt, compound, or separte circuit shunt, if the machine is to be used on extremely high voltages.

I do not limit myself to mechanical constructions herein shown and described, for it is obvious that large changes of construction may be made without in any way departing from the scope of my invention.

I claim:

1. The method of producing a uni-directional electro-motive force in an external circuit which consists in causing an inducing flux of given polarity to cut across the turns of an induced winding from end to end thereof in successive stages and always in the same direction, causing said flux to reverse suddenly when at the limit of travel across said winding and in the position of greatest inductive effect with relation thereto, and eliminating from the external circuit the component of electromotive force induced in said winding by said reversal.

2. The method of producing a unidirectional electromotive force which consists in causing an inducing flux of given polarity to cut across the turns of an induced winding from end to end thereof in successive stages and always in the same direction, causing said flux to reverse at the limit of travel across said winding and in position of greatest inductive effect with relation thereto and eliminating from the external circuit the component of electro-motive force induced in said winding by said reversal.

3. In a dynamo electric machine the combination with an induced winding and an inducing magnetic member of reversible polarity, of means for mechanically and cyclically moving said member relatively to said winding to induce an electro-motive force in one direction therein, means for magnetically reversing its polarity in a sychronous cycle, and means for rendering the electromotive force induced by said reversal ineffective at the terminals of said winding.

4. In a dynamo electric machine the combination with an induced winding and means for producing an inducing magnetic field of reversible polarity, of means for cyclically moving said field relatively to said winding to induce an electro-motive force in one direction therein, means for reversing its polarity in a synchronous cycle and means for rendering the electro-motive force induced by said reversal ineffective at the terminals of said winding.

5. The method of producing a unidirectional electromotive force which consists in causing an inducing flux of given polarity to cut across the turns of an induced winding from end to end thereof in successive stages and always in the same direction, causing said flux to rise and fall at the limit of travel across said winding and in position of greatest inductive effect with relation thereto and causing said winding to become substantially short circuited during the period of said rise and fall.

6. In a dynamo electric machine the combination with an induced winding and means for producing an inducing magnetic flux of reversible polarity, of means for moving said flux relatively to said winding to induce an electromotive force in one direction therein, means for reversing the polarity in a synchronous cycle and means for causing said winding to become substantially short circuited during the period of said reversal.

7. In a dynamo electric machine the combination with a plurality of induced windings and a plurality of means for producing an inducing magnetic flux of reversible polarity, of means for moving said flux relatively to said windings to induce an electromotive force in one direction therein, means for reversing the polarity in a synchronous cycle and means for rendering a substantially short circuit in said windings during the period of said reversals and means for combining a plurality of such sets with phase displacements, thereby producing a uniform and continuous electromotive force.

8. In an electric motor the combination with a plurality of power windings and a plurality of magnetic members of reversible polarity relatively rotatable and in mutually inductive relation, of current supply for causing motion of said members relatively to said windings to produce useful work thereby, means for reversing the polarity in a synchronous cycle and means for rendering ineffective the electromotive force induced by said reversals.

9. In apparatus of the class described, a generating element comprising the combination of an induced winding, an inducing element therefor including two concentric coils, one relatively stationary, and the other relatively rotatable about a diameter, a magnetic member carrying the second coil, and means for supplying current to said coils, whereby on rotation the axis of their resultant flux is cyclically rotated and its magnitude varied relative to said induced winding, and means for rendering ineffective at the terminals of the induced winding each alternate half wave of the alternating E. M. F. induced therein.

10. In apparatus of the class set forth, the combination with a pair of generating elements as defined in claim 9, of means for so connecting the respective inducing units that their resultant fluxes are in phase opposition.

11. In apparatus of the character described, the combination with a plurality of pairs of generating elements as defined in claim 10, of means for so connecting the pairs of inducing units, that the phases of their respective fluxes are successively displaced.

RICHARD A. ENGLER.

Witnesses:
 THOMAS A. BANNING, Jr.,
 FRANCES M. FROST.